United States Patent [19]

Herbst

[11] 4,271,428

[45] Jun. 2, 1981

[54] ARRANGEMENT FOR COLOR PICTURE SCANNING

[75] Inventor: Heiner Herbst, Haar, Fed. Rep. of Germany

[73] Assignee: Siemens Aktiengesellschaft, Berlin & Munich, Fed. Rep. of Germany

[21] Appl. No.: 57,000

[22] Filed: Jul. 12, 1979

[30] Foreign Application Priority Data

Aug. 31, 1978 [DE] Fed. Rep. of Germany ....... 2838098

[51] Int. Cl.³ .............................................. H04N 9/04
[52] U.S. Cl. ......................................... 358/54; 358/75
[58] Field of Search ................... 358/54, 75, 294, 212, 358/213

[56] References Cited

U.S. PATENT DOCUMENTS 3,239,606 3/1966 Chatten et al. ...................... 358/75

OTHER PUBLICATIONS

Lang, "Farbmetrik und Farbfernsehen", Oldenbourg Munich 1978, pp. 122-124.

*Primary Examiner*—Robert L. Richardson
*Attorney, Agent, or Firm*—Hill, Van Santen, Steadman, Chiara & Simpson

[57] ABSTRACT

An arrangement for photoelectric scanning of color pictures in which scanning light beams are evaluated in three or more color filters according to different sensitivity curves. Photoelectric receivers then drive evaluation signals which are coded into three color value signals. In such arrangements, it is desired to obtain constructions which are as simple, economic and space-saving as possible, as well as providing a great sensitivity to light. According to the invention, a charge transfer device image sensor has two image point rows lying adjacent one another and aligned in two lines of the color picture. The image points of the image sensor are combined into groups to which individual color filters and read-out channels are respectively assigned. In the read-out operation, the image information of one line are intermediately stored for the duration of one line. The field of application of the invention, in particular, is related to color film scanners in which a color television screen serves as the reproduction device.

16 Claims, 7 Drawing Figures

ARRANGEMENT FOR COLOR PICTURE SCANNING

BACKGROUND OF THE INVENTION

1. Field of the Invention

The present invention relates to an arrangement for scanning a color picture in which color filters are provided to evaluate the light beams performing this scanning according to three or more sensitivity curves which lie in different spectrum regions and in which photoelectric receivers are arranged behind the color filters to generate evaluation signals individually assigned to the spectrum ranges.

2. Description of the Prior Art

An arrangement of the type generally mentioned above can be derived from the book by H. Lang, "Farbmetrik und Farbfernsehen", Verlag R. Oldenbourg, Munich 1978, pp. 122-124. In this publication, a flying spot scanner for color transparencies is described on the basis of FIG. 7.6 in which a Braun tube having a luminescent point describing a television screen is provided as the light source. The light beams proceeding from the source and respectively focused on an image point of the color television picture permeate the picture and are divided into three light beams before being evaluated by means of color filters according to various spectrum range sensitivity curves to produce photo currents in photo multipliers which then are converted into color value signals of the primary colors red, green and blue. The color value signals then, for example, control the brightness of the primary colors of the color television picture tube. Such a control is illustrated in FIG. 5.2 of Page 89 of the Lang publication. Because of the small light intensities available to the photo multipliers, the signal-to-noise ratio is small in this arrangement.

SUMMARY OF THE INVENTION

The object of the present invention is to provide an arrangement of the type described in general above which operates in a significantly more interference-free manner than the known arrangement.

According to the present invention, the aforementioned object is achieved in that a charge transfer device image sensor having two image point rows lying next to one another and aligned to two lines of the color picture is provided, in that a device for shifting the color picture projected onto the sensor plane is provided, in that the image points of the first row are combined into a first group and the image points of the second row are combined into at least two further groups, in that the image points are respectively arranged behind color filters having different group-specific spectrum ranges and are connectible with one of a predetermined plurality of group-specific charge transfer devices, and in that the charge transfer devices assigned to a group respectively exhibit an output for the sequential read-out of all sensor signals derived from this group.

An advantage is attained in that, according to the present invention, the arrangement for color picture scanning can be constructed in a simple and space-saving manner and is operationally reliable. Moveover, it is distinguished by a great light sensitivity.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENT

Figure 1:
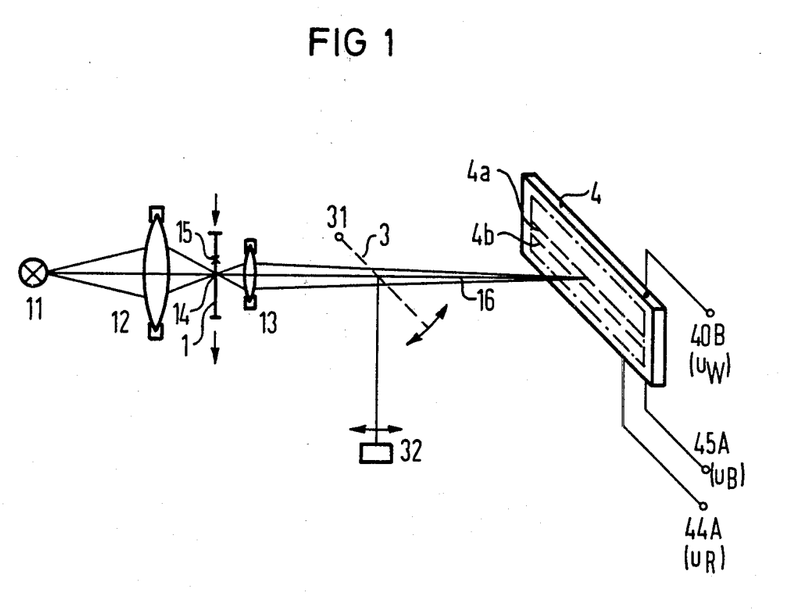
FIG. 1 is a diagrammatic illustration of the exemplary embodiment of the invention.

An arrangement for photoelectric scanning of a transparent color picture 1 is illustrated in FIG. 1 and comprises a stationary light source 11, a first optics 12, a second optics 13, and an image sensor 4 which will be described in detail below.

The image sensor 4 is illustrated in an imaging plane on which a focused imaging of the color picture 1 occurs by means of the optics 12 and 13. On the front surface of the image sensor 4 having an elongate cuboid shape, a color filter layer 2 is provided, behind which two rows of sensor image points, provided with the reference characters 4a and 4b, are arranged lying in close proximity. To lines of the color picture 1 proceeding perpendicular to the picture plane are respectively imaged on these image point rows; namely, in the beam path illustrated in FIG. 1, the line passing through the image point 14 is projected onto the image point row 4a, whereas the line passing through the image point 15 is at the same time projected onto the row 4b.

The color filter layer 2 comprises, in detail, a plurality of color filters arranged in two rows next to one another in a mosaic form, which filters can be divided into three types depending on their spectral sensitivity curves. The first color filter type evaluates the light beams 16 proceeding from the color picture 1 according to the sensitivity curve which lies in a spectrum range which approximately embraces the entire range of the visible light, whereby it exhibits an area of maximum sensitivity in the spectrum range with the primary color green. One also designates such a color as a W filter. The second type evaluates according to a sensitivity curve which lies in the spectrum range of the primary color red (R filter), whereas a sensitivity curve of the third filter type lies in the spectrum range of the primary color blue (B filter). a so-called G filter, whose sensitivity curve lies in the spectrum range of the primary color green, can also be employed in the place of the W filter.

In the exemplary embodiment illustrated, let it first be assumed that the image points of the row 4a are combined into a first group, whereas a second group and a third group are formed from the image points of the row 4b. Thereby, W filters are arranged in front of the image points of the first group, R filters are respectively arranged in the front of the image points of the second group and B filters are respectively arranged in the front of those of the third group. In this case, sensor signals $u_W$ which correspond to the image information stored in the image points of the first group, proceeding from the line of the color picture 1 passing through 14, and evaluated by means of the W filters are sequentially read by the sensor 4 and a first output 40B. At the same time, sensor signals $u_R$ which correspond to the image information stored in the second group of image points, proceeding from the image line passing through 15 and evaluated by means of R filters are read at a second output 44A of the image sensor 4. Finally, by way of an output 45A, sensor signals $u_B$ are read which correspond to the image information stored in the third group of image points, proceeding from the picture line passing through 15 and evaluated by means of the B filters. Thereby, the signal $u_W$, $u_R$ and $u_B$ represent evaluation signals which are clearly assigned to the sensitivity curves of the color filters employed. In a manner known per se, three color value signals can be derived from these signals which then control the brightness of the primary colors of the color television picture tube. Depending on the gradient of the sensitivity curves, and upon the width of the spectrum ranges defined by means of such curves, a special coding of the evaluation signals occurs in order to obtain the color value signals.

Deviating from this, G filters can also be employed in front of the image points of the first group instead of the W filters, whereby the filters of the other image point groups remain unchanged. In this case, evaluation signals $u_G$ are read at the output 40B. For deriving the three color values, then, the signals $u_G$, $u_R$ and $u_B$ are coded. On the other hand, the color filter types can be interchanged as desired in their allocation to the three image point groups, whereby the sensor signals derived from the first image point group always appear at the output 40B, the sensor signals derived from the second group appear at the output 44A and the sensor signals of the third image point group appear at the output 45A.

Color filter sensitivity curves which can be employed for the exemplary embodiment according to FIG. 1 can be derived, for example, from the aforementioned book by H. Land on Page 91, in particular, FIG. 5.4.

Advantageously, the image points of the second row 4b are divided between the second and third image point groups in such a manner that image points lying next to one another respectively belong to different groups. This can be derived in detail from FIG. 2 which illustrates, in a top view, a first embodiment of the image sensor 4 which is diagrammatically illustrated in FIG. 1, as an integrated circuit on a semiconductor substrate. The semiconductor substrate is referenced 41 and can consist, for example, of n conductive silicon. An electrically insulating layer of, for example, SiO$_2$ covers the substrate surface and is designed significantly thinner within the broken lines 42 then outside of such broken lines. The thinner areas are also designated as gate oxide areas, while the thicker areas are designated as field oxide areas. Two sensor gate electrodes 43a and 43b, which are flanked on the one side by electrode rows 44 and 45, and on the other side by electrode rows 46 and 47, are located above the insulating layer. The electrodes are electrically conductive structures which particularly consist of an electrically conductive coating applied over the entire surface. This coating, for example, is formed of polycrystalline, highly-doped silicon, or consists of a metal layer, for example aluminum. The manufacture of the electrodes 43a and 43b and of the electrode rows 44-47 occurs in a conventional manner, for example, by means of a series of photolithographic steps upon employment of masks which define the contours of the individual structures.

Figure 2:
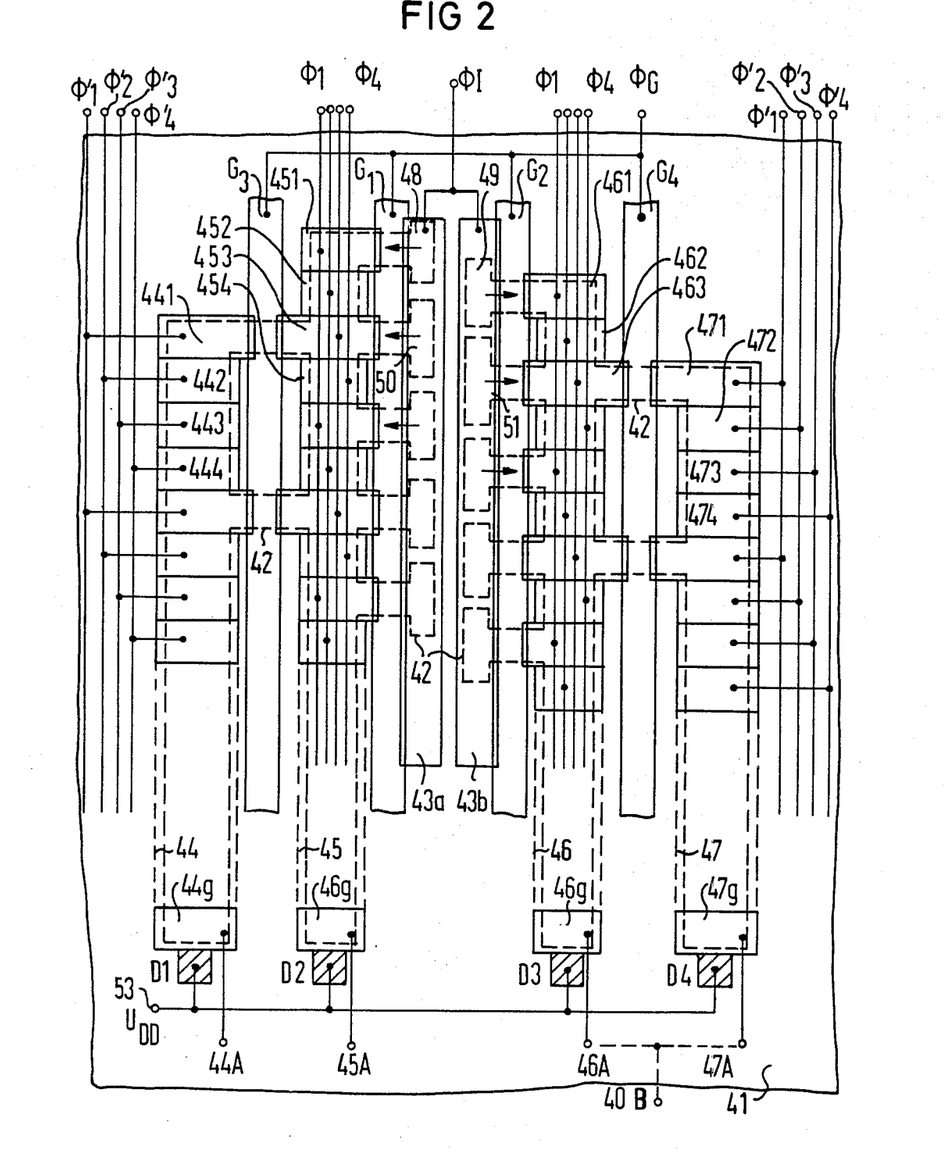
FIG. 2 illustrates, in a planar view, a charge transfer device image sensor which can be employed in the arrangement of FIG. 1.

More specifically, the locations of the semiconductor substrate 41 which are covered by the sensor gate electrodes 43a and 43b and which are situated beneath the thin oxide layers represent individual image points 48, 49, 50, 51, etc of the image sensor. According to the invention, these image points are arranged in two rows parallel to one another, whereby the image points 49, 51, etc. lie in a first row which is indicated in FIG. 1 as the row 4a, whereas the image points 48, 50, etc. are arranged in a second row which bears the reference symbol 4b in FIG. 1. The electrode rows 44-47 are respectively formed of individual electrodes 441, 442, 443, 444 . . . 451, 452, 453, 454 . . . which lie in close proximity to one another. Thereby, the electrode 451 is located at the level of the image point 48, the electrodes 452 and 461 are located at the level of the image point 49, the electrodes 441, 453 and 462 are located at the level of the image point 50, the electrodes 442, 454, 463, and 461 are located at the level of the image point 51, etc. Transfer gate electrodes G$_1$, G$_2$ are respectively located between the electrode rows 45 and 46, on the one hand, and the sensor gate electrodes 43a and 43b on the other hand, which transfer gate electrodes slightly overlap the former on the side, but are electrically insulated therefrom by means of an intermediate insulating layer. Further transfer gate electrodes G$_3$ and G$_4$ are located between the electrode rows 44 and 45 and the electrode rows 46 and 47. The sensor gate electrodes 43a and 43b are connected to a pulse voltage $\phi_I$, the transfer gate electrodes G$_1$-G$_4$ are connected to a pulse voltage $\phi_G$ by way of a common connection, every fourth electrode 451, 454, etc., of the row 45 is connected by way of a common line with a pulse voltage $\phi_1$, every fourth electrode 452, 455, etc., is connected by way of a common line to a pulse voltage $\phi_2$, every fourth electrode 453, etc., is connected by way of a common line to a pulse voltage $\phi_3$, and every fourth electrode 454, etc., is connected by way of a line to the pulse voltage $\phi_4$. The individual electrodes of the row 46 are connected with the pulse voltages $\phi_1$-$\phi_4$ in an analogous manner, whereas the electrodes of the rows 44 and 47 are connected with the pulse voltages $\phi_1'$-$\phi_4'$.

Each of the electrode rows 44–47 belongs to a charge transfer device which is clock pulsed by means of the pulse voltages $\phi_1$-$\phi_4$ or, respectively, $\phi_1'$-$\phi_4'$. At the bottom end of each electrode row electrodes 44g-47g are represented which are free of the clock pulse voltages, but which are connected to outputs 44a-47a. Diffusion areas D$_1$-D$_4$ are connected to a drain voltage $u_{DD}$ by way of a common connection 53 and are arranged after the electrodes on the output side. The output 46A and 46A can be connected with a common output 40B.

Figure 3:
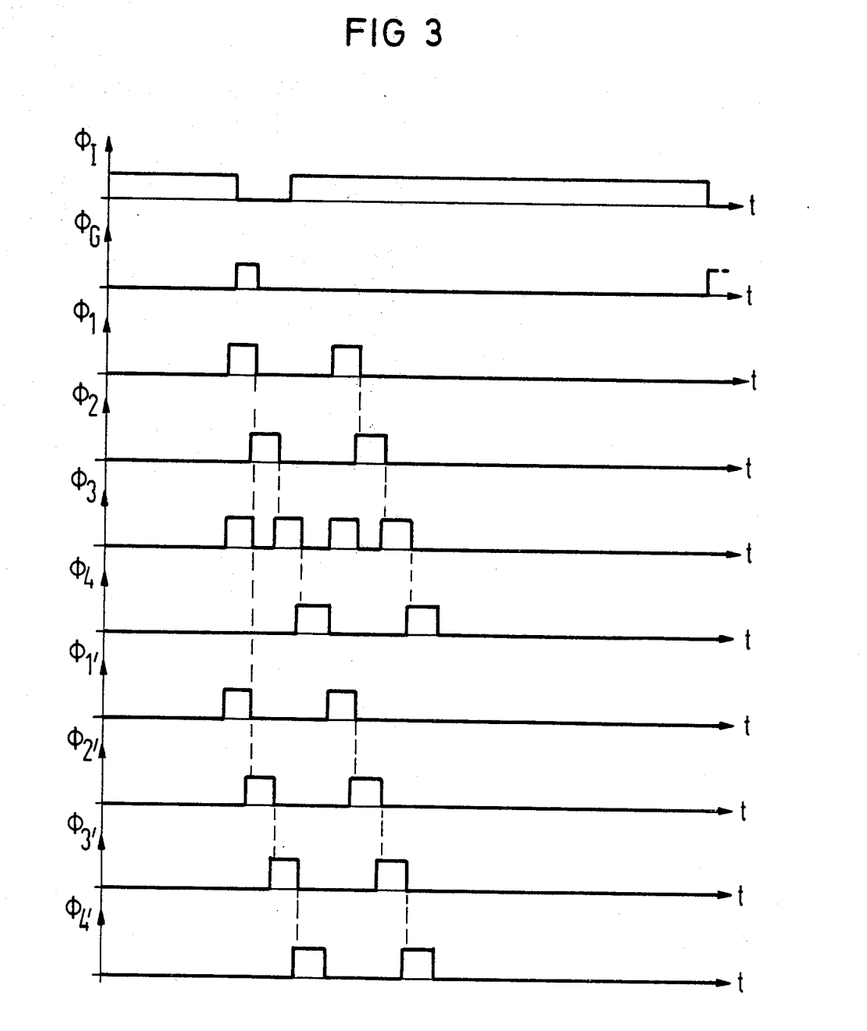
FIG. 3 is a graphic illustration of the voltage-time waveforms for explaining the manner of operation of an image sensor constructed in accordance with FIG. 2.

In operation, a pulse $\phi_I$ is first applied which determines the integration time. Within the integration time, electric charges whose magnitudes correspond to the respective local illumination intensity collect in the image points 48-51, etc, under the influence of the illumination. After the expiration of the average or integration time, a transfer gate puulse $\phi_G$ causes a displacement of these charges in a direction of the arrows indicated from the image points into the area of the charge transfer devices 44–47; namely, the charge which arose under the electrode 48 is transferred under the electrode 451, the charge which arose under the electrode 49 is transferred under the electrode 461, the charge which arose under the electrode 50 is transferred under the electrode 441, and the charge which arose under the electrode 51 is transferred under the electrode 471. By means of a clock pulse voltages $\phi_1-\phi_4$ and $\phi_1'-\phi_4'$ occurring in time according to FIG. 3, the charges, after passing the charge transfer devices, are pushed through step-by-step under the electrodes 44g–47g and finally arrive into the diffusion areas D1–D4. The potential displacements hereby arising at the electrodes 44g–47g are transmitted to the outputs 44a–47a and there produce readout signals which consists of pulse-shaped portions which occur in succession and which respectively correspond to the illumination intensities in the image points read in succession during the integration time.

The average or integration time defined by means of the next successive pulse $\phi_I$ coincides in time with the shift of the charges formed in the preceding integration time through the charge transfer devices 44–47.

Instead of the illustrated charge transfer devices 44–47, which are to be interpreted as SCCD devices having a charge transport immediately below the substrate surface, or as BCCD devices with a charge transport in the interior of the substrate, bucket brigade devices (BBD) known per se can also be employed in the sense of the present invention. Both systems of charge transfer devices are described by Sequin and Tompsett, in their book "Charge Transfer Devices", Academic Press, New York, 1975, pp. 1–18.

According to the aforementioned information concerning FIG. 1, W filter would be arranged in FIG. 2 in front of the image points 49, 51, etc., and R filter would be arranged in front of the image point 51, and a B filter would be arranged in front of the iamge point 48. The amounts of charge shifted by way of the devices 46 and 47 generate output signals which are superimposed on one another at a common point 40B of both devices and thus form the evaluation signal $u_W$. The sensor signals read by way of the device 44 produce the evaluation signal $u_R$ at the output 44A, while the sensor signals read by way of the row 45 produce the evaluation signal $u_B$ at the output 45A.

In order to scan the next two lines, the picture 1 in FIG. 1 is displaced in the direction of the arrow by two line intervals, particularly in the framework of a continuous forward feed motion. Therewith, the imaging of the color picture 1 projected onto the plane of the image sensor 4 is also shifted so that the image point rows are aligned to the next two lines. The displacement can also be undertaken by means of a device which transports a plurality of color pictures which are applied to a common carrier in the arrow direction. In particular, a color film scanning can occur in this manner.

Another solution for achieving a forward feed motion consists in that a mirror 3 is arranged in the beam path of the light beams 16, which mirror is rotatably mounted around a stationary axis 31. The beams which are reflected displace the imagings of the picture 1 projected onto the plane of an image sensor 32 in the direction of the indicated double arrows.

Figure 4:
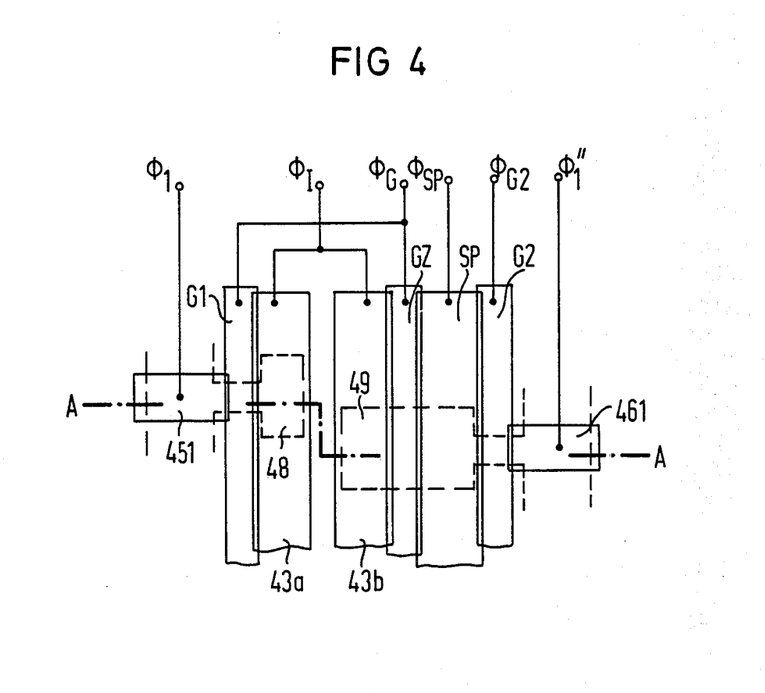
FIG. 4 illustrates another exemplary embodiment of a charge transfer device image sensor which can be employed in the structure of FIG. 1.

FIG. 4 illustrates another embodiment of the image sensor 4 which may be employed in the apparatus of FIG. 1. This corresponds to FIG. 2 with the difference that an additional transfer gate GZ and a strip-shaped electrode SP are arranged between the sensor gate 43b and the transfer gate G2. In accordance with FIG. 2, at the side adjacent the transfer gate electrodes G1 and G2, the electrodes 451 and 461 are illustrated under which the charge carriers integrated in the image points 48 and 49 are displaced. The additional transfer gate GZ is connected with the clock pulse $\phi_G$ which is also connected to the electrode G1, whereas the electrode SP is connected with a further clock pulse voltage $\phi_{SP}$. The transfer gate G2 is connected to a clock pulse voltage $\phi_{G2}$ and the clock pulse voltage applied at the electrode 461 is referenced $\phi_1''$.

Figure 5:
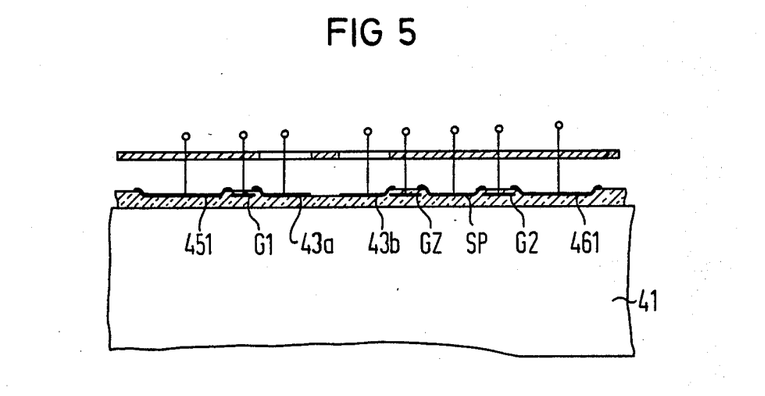
FIG. 5 is a cross-sectional representation of an image sensor according to FIG. 4 taken along the parting line A—A of FIG. 4.

FIG. 5 illustrates, in cross section, the arrangement according to FIG. 4. A screen or diagram B which filters the corresponding portions of the semiconductor substrate 41 from incident light is provided above the conductive coatings 451, G1, GZ, SP, G2 and 461. Only the substrate areas beneath the sensor gate electrodes 43a and 43b which represent the image points are illuminated through the openings B1 and B2.

Figure 6:
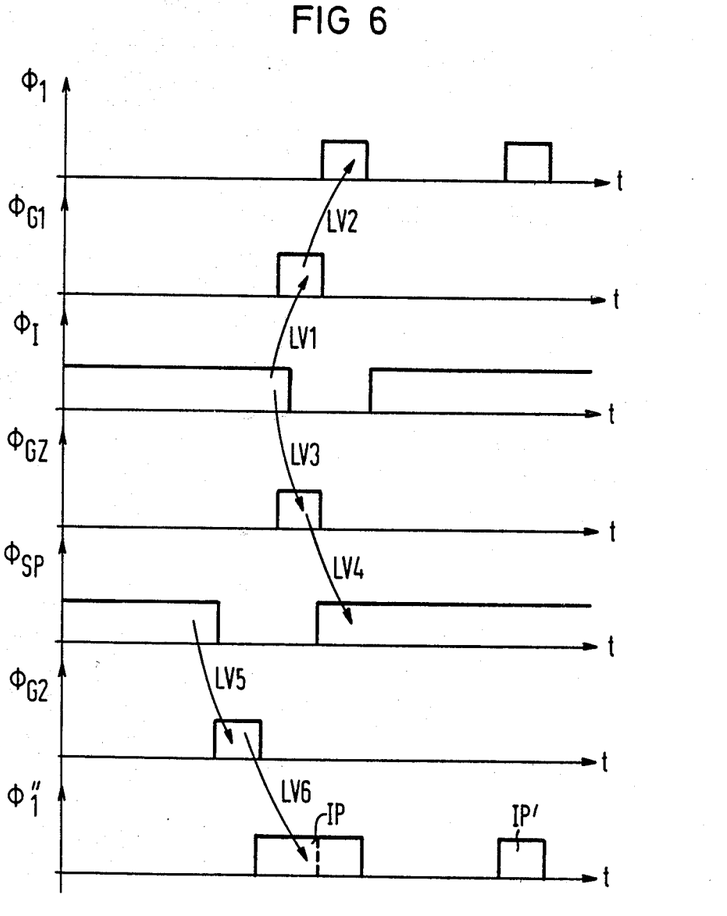
FIG. 6 is a graphic illustration of the voltage-time waveforms for the image sensor constructed in accordance with FIG. 4.

It can be seen from the voltage-time diagrams of FIG. 6 that the gate electrodes G1 and GZ are occupied with pulses at the end of an integration interval, i.e. at the end of the pulse $\phi_I$. This results in a charge transfer (LV1, LV2) from the image point 48 under the electrode 451 and a charge transfer (LV3, LV4) from the image point 49 into the insulation layer capacitor formed upon the application of the voltage $\phi_{SP}$ by the electrode SP, together with the portion of the semiconductor substrate lying therebelow, and the insulating layer lying therebetween. Shortly before the occurrence of the pulse $\phi_{G1}$ or, respectively, $\phi_{GZ}$, the transfer gate between the insulating layer capacitor SP and the electrode 461 is opened by means of a pulse $\phi_{G2}$ so that the charge intermediately stored in the storage capacitor SP after the preceding integration time can be transferred under the electrode 461 (LV5, LV6). The pulse IP of the clock pulse $\phi_1''$ is extended with respect to the other pulses IP' of the clock pulse $\phi_1''$ in order to render possible the transfer process LV6. Apart from the length of the pulse IP upon reading of the insulating layer capacitor SP, the clock pulse voltage $\phi_1''$ occurs corresponding to the clock pulse voltage $\phi_1$.

According to the foregoing, the following operating manner of the circuit according to FIG. 4 occurs: the image information evaluated with a W filter from the image point 49 are intermediately stored in the capacitor SP after the integration time, whereas the information evaluated with a B filter from the image point 48 arrive directly into the device 45 for reading. Parallel to the read-out process, another read-out process proceeds by way of the device 46, which relates to the image information from the image point 49 intermediately stored in the capacitor SP after the preceding average or integration time. If the time feed of the color picture 1 is selected in such a manner that a shift of one line interval occurs during an integration period, then, first, a W information is intermediately stored from one and the same line and, after the next average process, the B information is then directly read, whereby the reading of the intermediately stored W information also occurs in parallel thereto. Since, parallel to the reading of B information, the R information is also read, namely, by way of its own charge transfer device which is not illustrated in FIG. 4, the evaluation signals $u_W$, $u_B$ and $u_R$ belonging to one and the same image line arrive practically simultaneously at the outputs 44A–47A or, respectively, 44A, 45A and 40B (FIG. 2), although these signals are derived from the image points aligned to neighboring lines. By doing so, colored marginal strips are individual contours are avoided in the reproduction of the color picture 1 by means of the color value signals which control the brightness of the primary colors of the color television picture tube.

Figure 7:
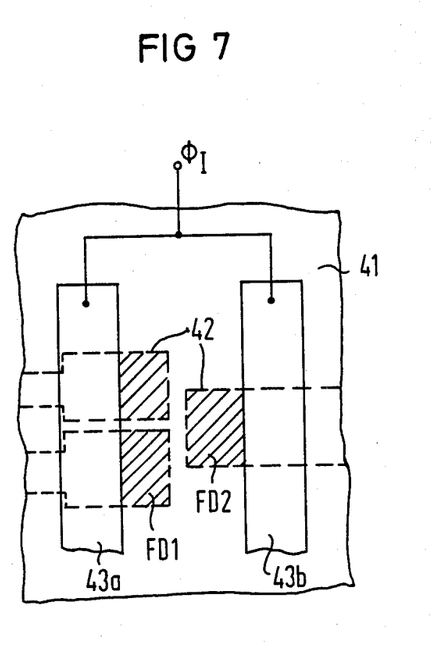
FIG. 7 is a schematic representation of a further development of the image sensors according to FIGS. 2 and 4.

FIG. 7 illustrates a further development of the image sensors illustrated in FIGS. 2 and 4 in which re-doped semiconductors areas FD1, FD2, etc, are respectively provided between the electrodes 43a and 43b in an extension of the thin oxide areas illustrated there. These form photodiodes which further increase the sensitivity of the image sensors. Thereby the portions of the semiconductor substrate which lie beneath the electrodes 43a and 43b, and which lie adjacent to the photodiodes represent metal-insulation-semiconductor (MIS) capacitors in which the charge carriers generated by the photodiodes are stored. Thereby, all areas of the semiconductor surface beyond the photodiodes FD1, FD2, etc, are screened from incident light.

For a better preparation of the evaluation signals read from the charge transfer devices 44–47, it is advantageous to connect sample and hold stages to the outputs 44A–47A or, respectively, to the output 40B, which sample and hold stages store a read signal value until it is replaced by the next successive signal value.

The color filters arranged in front of the image points can either be arranged on transparent carrier plates which are then secured to the image sensor or can consist of color layers which are applied directly to the surface of the image sensor.

In order to obtain the evaluation signal $u_R$ and $u_B$, it is in many cases sufficient to select the plurality of allocated image points smaller than the plurality of image points required for the derivation of the signal $u_W$. For example, the number of image points serving for the production of the signals $u_R$ and $u_B$ can respectively amount to one-fourth of the number of image points provided for the signal $u_W$.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for scanning a color picture line-wise with a projecting light beam, comprising:
   shift means operable to shift the projected color picture perpendicular to the scan direction;
   an image sensor comprising a plurality of charge transfer devices each including an output, a first row of image points aligned with a scan line and constituting a first group of image points, a second row of image points aligned with another scan line and divided into second and third groups of image points, said groups of image points being operably connected to said charge transfer devices for feeding charges thereto;
   first, second and third types of color filters, each type covering a specific spectrum range, located in front of said first, second and third groups of image points to accumulate corresponding image signals as charges;
   first charge transfer means operable to connect and transfer charges between image points and the respective charge transfer devices; and
   second charge transfer means connected to said charge transfer devices and operable to sequentiallyu transfer the charges stored therein to the respective outputs as image signals.

2. The apparatus of claim 1, comprising:
   a plurality of sample and hold circuits connected to respective outputs of said charge transfer devices.

3. The apparatus of claim 1, wherein said shift means comprises:
   a mirror device pivotally mounted for movement about a fixed axis; and
   means for pivoting said mirror means.

4. The apparatus of claim 1, wherein said shift means comprises:
   a transport for carrying a color picture; and
   transport movement means for moving said transport perpendicular to the scan direction.

5. The apparatus of claim 4, wherein said transport comprises:
   a common carrier for carrying a plurality of pictures.

6. The apparatus of claim 1, wherein said image sensor comprises:
   a doped semiconductor substrate;
   said image points comprise oppositely doped regions in said substrate; and
   an insulating layer covering said semiconductor substrate.

7. The apparatus of claim 1, wherein said image sensor comprises:
   a doped semiconductor substrate;
   said image points comprise metal-insulation-semiconductor storage capacitors including an insulating layer covering said semiconductor substrate.

8. The apparatus of claim 1, wherein said image sensor comprises:
   a doped semiconductor substrate;
   said image points comprise metal-insulation-semiconductor storage capacitors and corresponding and respectively neighboring photodiodes including an insulating layer covering said semiconductor substrate.

9. The apparatus of claim 1, comprising:
   carrier plate means mounting said color filters in front of said image sensor.

10. The apparatus of claim 1, wherein:
    said color filters comprise color layers carried on the front surface of said image sensors.

11. The apparatus of claim 1, wherein said first type of color filter covers approximately the entire spectrum range of visible light and has a maximum sensitivity range in the spectrum range of the primary color green, said second type of color filter covers the spectrum range of the primary color red, and said third type of color filter covers the spectrum range of the primary color blue.

12. The apparatus of claim 1, wherein said first type of color filter covers the spectrum range of the primary color green, said second type of color filter covers the spectrum range of the primary color red, and said third type of color filter covers the spectrum range of the primary color blue.

13. The apparatus of claim 1, wherein said image points of said second row and located such that image points of said second and third groups are alternate in said second row.

14. The apparatus of claim 1, wherein alternate image points of said first row are connectible to respective ones of said charge transfer devices.

15. The apparatus of claim 1, wherein said image sensor comprises:
   a doped semiconductor substrate;
   an insulating layer covering said substrate;
   said first and second rows of image points and said charge transfer devices located parallel to one another;
   a first transfer gate and a second transfer gate on said insulating layer parallel to one another between one of said image point rows and the associated charge transfer devices; and
   a strip-shaped electrode on said insulating layer between and parallel to said first and second transfer gates and forming capacitors with the semiconductor substrate therebelow.

16. In a method of scanning a color picture line-wise with a projecting light beam, in which an image sensor comprises a plurality of charge transfer devices each including an output, a first row of image points for alignment with a scan line and constituting a first group of image points, a second row of image points for alignment with another scan line and divided into second and third groups of image points, said groups of image points being operably connected to the charge transfer devices for feeding charges thereto and in which the light beam is filtered by first, second and third types of color filters, each type covering a specific spectrum range, located in front of said first, second and third groups of image points to store corresponding image signals as charges, the improvement therein comprising the steps of:
   projecting the light beam from a first line of the color picture, onto the first row of image points and storing charges therein;
   shifting the projected color picture so that the light beam projects from said first line of the color picture onto the second row of image points and accumulating charges therein;
   transferring the stored charges from the first image point row to corresponding charge transfer devices; and transferring the stored charges from the second image point row to corresponding charge transfer devices.

* * * * *